United States Patent
Numata (10) Patent No.: US 9,036,179 B2
(45) Date of Patent: May 19, 2015

(54) MANAGEMENT SYSTEM, MANAGEMENT METHOD, AND STORAGE MEDIUM FOR MANAGING CUSTOMER INFORMATION AND NETWORK DEVICE INFORMATION

(71) Applicant: Canon Kabushiki Kaisha, Tokyo (JP)

(72) Inventor: Masahito Numata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/146,055

(22) Filed: Jan. 2, 2014

(65) Prior Publication Data

US 2014/0198336 A1 Jul. 17, 2014

(30) Foreign Application Priority Data

Jan. 16, 2013 (JP) ................. 2013-005262

(51) Int. Cl.
*G06K 15/00* (2006.01)
*H04N 1/32* (2006.01)
*G06F 3/12* (2006.01)
*H04N 1/44* (2006.01)

(52) U.S. Cl.
CPC ........ *G06K 15/4095* (2013.01); *H04N 1/32106* (2013.01); *H04N 1/4413* (2013.01); *H04N 1/4426* (2013.01); *H04N 1/4433* (2013.01); *H04N 2201/3278* (2013.01); *H04N 2201/3214* (2013.01); *H04N 2201/3215* (2013.01); *H04N 2201/3219* (2013.01); *H04N 2201/3274* (2013.01); *H04N 2201/3205* (2013.01)

(58) Field of Classification Search
CPC ............ H04N 1/32106; H04N 1/4426; H04N 1/4433; H04N 1/4413; H04N 2201/3205; H04N 2201/3214; H04N 2201/3215; H04N 2201/3219; H04N 2201/3274; H04N 2201/3278; G06K 15/4095
USPC .............. 358/1.9, 1.13, 1.14, 1.15, 1.18, 405, 358/407; 709/201, 209, 217, 220, 238, 248; 700/91; 705/7.36, 7.41; 707/659
See application file for complete search history.

(56) References Cited

U.S. PATENT DOCUMENTS

| | | | | |
|---|---|---|---|---|
| 7,660,007 | B2 * | 2/2010 | Uchida | 358/1.15 |
| 7,940,685 | B1 * | 5/2011 | Breslau et al. | 370/251 |
| 2007/0124737 | A1 * | 5/2007 | Wensley et al. | 719/314 |
| 2007/0136485 | A1 * | 6/2007 | Mitsui | 709/230 |
| 2008/0201454 | A1 * | 8/2008 | Soffer | 709/220 |
| 2012/0210414 | A1 | | 8/2012 | Tamura |

FOREIGN PATENT DOCUMENTS

JP 2012-168795 A 9/2012

* cited by examiner

*Primary Examiner* — Gabriel Garcia
(74) *Attorney, Agent, or Firm* — Carter, DeLuca, Farrell & Schmidt, LLP (57) ABSTRACT

A device management system totals print result information for each customer user. The device management system receives a request including customer information from a client terminal, and responds to the client with a redirect URL for causing the client to access an image forming apparatus installed in an environment corresponding to customer information included in the request in order for user authentication of the client terminal. When the image forming apparatus accessed by the client terminal has succeeded the user authentication, the print result information relating to the user is provided to the client terminal.

9 Claims, 8 Drawing Sheets

| Tenant ID | Device ID | Print result function | IP address | Operation status | Error status | Final success date and time | Print result saved date |
|---|---|---|---|---|---|---|---|
| AAA001 | ZZZxxxx1 | Absent | 192.168.10.9 | Operating | Normal | No information | No information |
| AAA001 | ZZZxxxx2 | Present | 192.168.10.10 | Operating | Normal | No information | 2011/11/15 |
| AAA001 | ZZZxxxx3 | Present | 192.168.10.11 | Operating | Normal | 2012/9/10 14:25:41 | 2011/11/15 |
| AAA001 | ZZZxxxx4 | Present | 192.168.10.12 | Operating | Fatal error | 2012/9/5 8:57:41 | 2011/11/15 |
| AAA001 | ZZZxxxx5 | Present | 192.168.10.13 | Operating | Paper jam | 2012/9/3 11:41:11 | 2011/11/15 |
| AAA001 | ZZZxxxx6 | Present | 192.168.10.14 | Economy mode | Normal | 2012/9/2 15:41:11 | 2011/11/14 |
| AAA001 | ZZZxxxx7 | Present | 192.168.10.15 | Power OFF | Normal | 2012/9/1 11:41:05 | 2011/11/14 |
| AAA001 | ZZZxxxx8 | Present | 192.168.10.16 | Updating | Normal | 2012/9/4 10:41:14 | 2011/11/15 |
| BBB002 | YYYxxxx1 | Present | 172.20.10.10 | Operating | Normal | 2012/9/10 11:41:05 | 2011/11/15 |
| ... | ... | ... | ... | ... | ... | ... | ... |

FIG. 10

MANAGEMENT SYSTEM, MANAGEMENT METHOD, AND STORAGE MEDIUM FOR MANAGING CUSTOMER INFORMATION AND NETWORK DEVICE INFORMATION

BACKGROUND OF THE INVENTION

1. Field of the Invention

The present invention relates to a technique in which result information for a customer user is provided to the client.

2. Description of the Related Art

There has been proposed a device management service that performs device management, failure recovery, printing condition management, and the like of customers' image forming apparatuses (such as a copy machine, a printer, and the like). It is contemplated that the above device management service is realized as a cloud service by a server on the Internet. Such a device management service realized as the cloud service manages the image forming apparatus per unit, such as a customer or a group, and transmits/receives device management information such as device information and a result value of a print (result information) between the image forming apparatuses and the server on the Internet. In this context, it is contemplated that when a management system controls processing, so that the server on the Internet performs device authentication of the image forming apparatus that is a transmission/reception target of device management information, only the image forming apparatus whose authentication has succeeded is allowed to transmit/receive the device management information.

Japanese Patent Application Laid-Open No. 2012-168795 discloses an information processing system in which a service provider redirects authentication processing to an identity provider that responds to a preregistered customer so that the identity provider executes the authentication processing when the service provider receives an unauthenticated request.

However, in the case of the management system in which the server performs the device authentication of the device that is the transmission/reception target of the device management information is applied, the device authentication has to be performed for acquisition of the device management information by a user, and as the result, the device is limited to the devices capable of acquiring the device management information. For example, device registration of all devices such as personal computers and mobile terminals of customers poses a huge load on a user.

On the other hand, a management system in which a server on the Internet executes user management, authenticates a user who requires management information, and transmits the management information to the user whose authentication has succeeded is contemplated. However, since the user management has also executed in the intranet under a usage environment of a customer in recent years, additional user management in the server on the internet increases the load. Also, the user management in the server on the Internet may not ensure security.

Also, even in an information processing system disclosed in Japanese Patent Application Laid-Open No. 2012-168795, the service provider (management system) is required to execute the user management for executing the authentication in response to the request. Also, the identity provider assumes a server that stably operates with respect to this information processing system, but the information processing system does not determine whether or not the server that is an access redirect destination from a user operates stably.

SUMMARY OF THE INVENTION

The present invention provides a technique in which, in response no the request from a client, result information for a customer user is provided to the client without increasing the load relating to user management and with the ensured security.

According to an aspect of the present invention, a management system is provided that manages customer information of a customer and information of one or more network devices installed in an environment to which the customer belongs. The management system includes a totaling unit configured to total result information of each the customer and collected from the one or more network devices; a receiving unit configured to receive a request including customer information from a client; and a responding unit configured to respond to the client with control information for causing the client to access any one of the one or more network devices installed in an environment corresponding to the customer information included in the request in order for user authentication. When the user authentication has succeeded at any one of the network devices accessed by the client with the control information, the result information of the user totaled by the totaling unit is provided to the client via the network device that has performed the user authentication.

Further features of the present invention will become apparent from the following description of exemplary embodiments with reference to the attached drawings.

DESCRIPTION OF THE EMBODIMENTS

Figure 1:
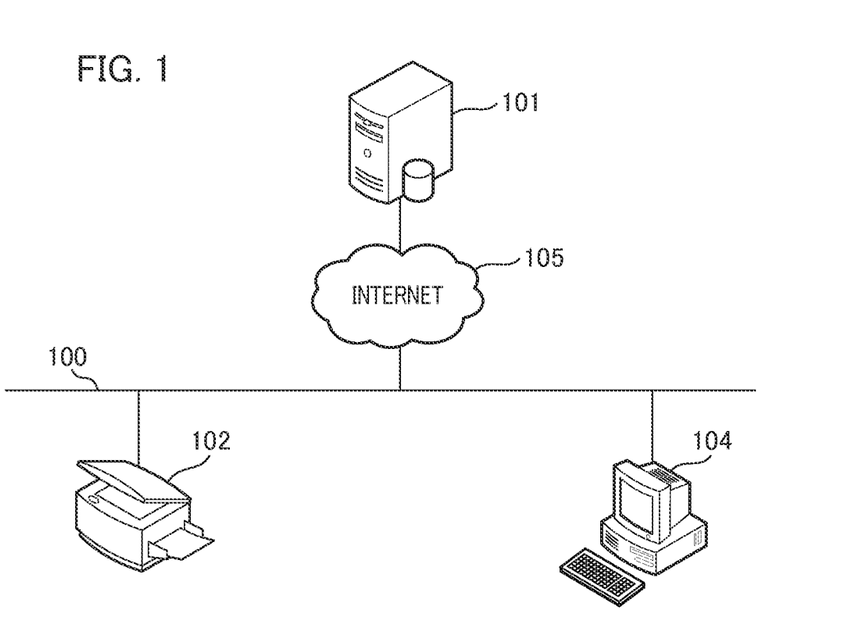
FIG. 1 is a diagram illustrating a configuration example of the present embodiment.

FIG. 1 is a diagram illustrating a configuration example of the present embodiment. A device management system 101 includes a plurality of servers so as to realize a cloud service. Specifically, the device management system 101 provides result information for a customer to the client terminal 104 in response to a request from the client terminal 104.

The image forming apparatus 102 executes image reading processing, printout processing, and the like. The image forming apparatus 102 communicates with the client terminal 104 through a network 100. In the present embodiment, device authentication of the image forming apparatus 102 can be performed by the device management system 101. The client terminal 104 is an information processing apparatus (for example, a personal computer) which a user operates. In the present embodiment, the client terminal 104 includes a terminal for which the device management system 101 is incapable of performing device authentication because the terminal is not registered with the device management system 101. The image forming apparatus 102 and the client terminal 104 communicate with the device management system 101 through the network 101 and the Internet 105.

Note that the client terminal 104 is not limited, to a personal computer, and may be an image forming apparatus, a mobile terminal and the like that have the same level of function. The network 100 is a communication line for exchanging information between the aforementioned devices, and the type of the internet and the intranet, and wire/wireless are not limited.

Figure 2:
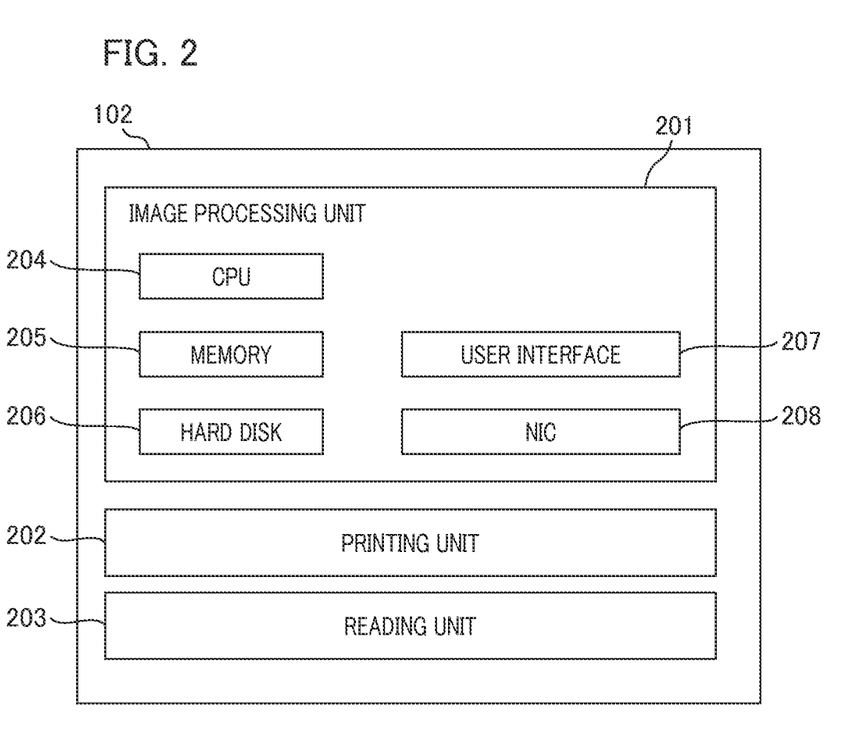
FIG. 2 is a diagram illustrating an example of a hardware configuration of an image forming apparatus.

FIG. 2 is a diagram illustrating an example of a hardware configuration of the image forming apparatus. The image forming apparatus 102 includes an image processing unit 201, a printing unit 202, and a reading unit 203. When the image forming apparatus 102 is not a multifunctional apparatus, a configuration except for the reading unit 203 may be applied to the image forming apparatus 102. The image processing unit 201 includes a CPU (Central Processing Unit) 204, a memory 205, a hard disk 206, and a user interface 207.

The CPU 204 executes various types of computer programs so as so realize different functions. The memory 205 is a unit for temporarily storing various types of information, and is also used as a temporary working memory area for the CPU 204. The CPU 204 loads the computer programs stored in the hard disk 206 into the memory 205 and executes them. The hard disk 206 is a unit for storing various types of data, and may be another hardware having the same level of function such as a flash memory.

The user interface 207 is a unit for accepting a preprocessing request from a user, outputting a screen to she user, and the like. The NIC (Network Interface Card) 208 is a unit for connecting the image forming apparatus 102 to the network 100. FIG. 2 illustrates a representative hardware configuration of the image forming apparatus 102, but the image forming apparatus applied in the present embodiment is not limited to the configuration shown FIG. 2. A Fax board, an external control device and the like may be connected to the image forming apparatus.

Figure 3:
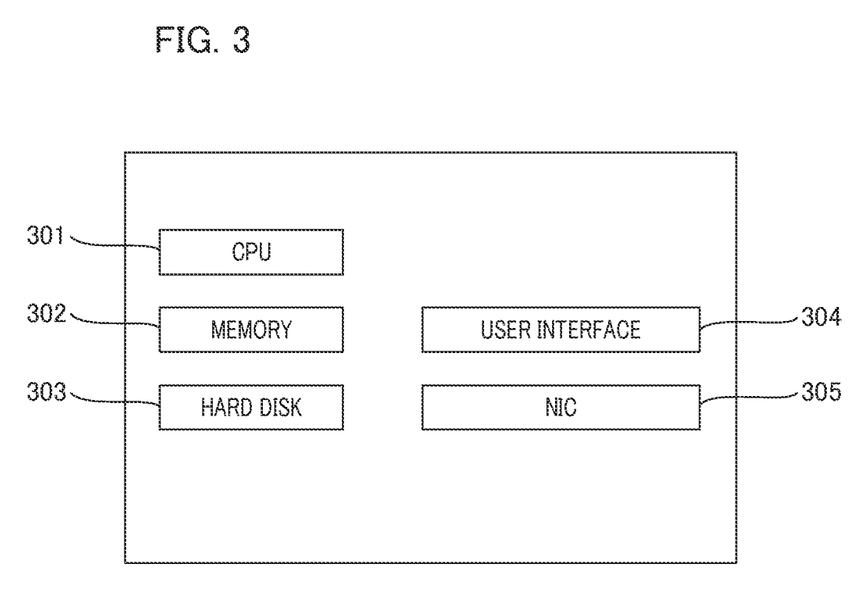
FIG. 3 is a diagram illustrating an example of a hardware configuration of a device management system or a client terminal.

FIG. 3 is a diagram illustrating an example of a hardware configuration of the device management system and the client terminal. The CPU 301 executes various types of programs so as to execute different functions. A memory 302 is a unit for temporarily storing various types of information, and also used as a work memory area for the CPU 301. The CPU 204 loads the computer programs stored in the hard disk 206 into the memory 205 and executes them. The hard disk 303 is a unit for storing various types of data, and may be another hardware having the same level of function such as a flash memory.

A user interface 304 is a unit for receiving a processing request from a user, outputting a screen to the user and the like. An NIC 305 is a unit for connecting the device management system 101 and the client terminal 104 to the network 100, and each device can connect to the network 100 by using the NIC 305. FIG. 3 illustrates a representative hardware configuration of the device management system 101 and the client terminal 104, but the configuration of the device management system and the client terminal 104 is not limited to the configuration shown in FIG. 3.

Figure 4:
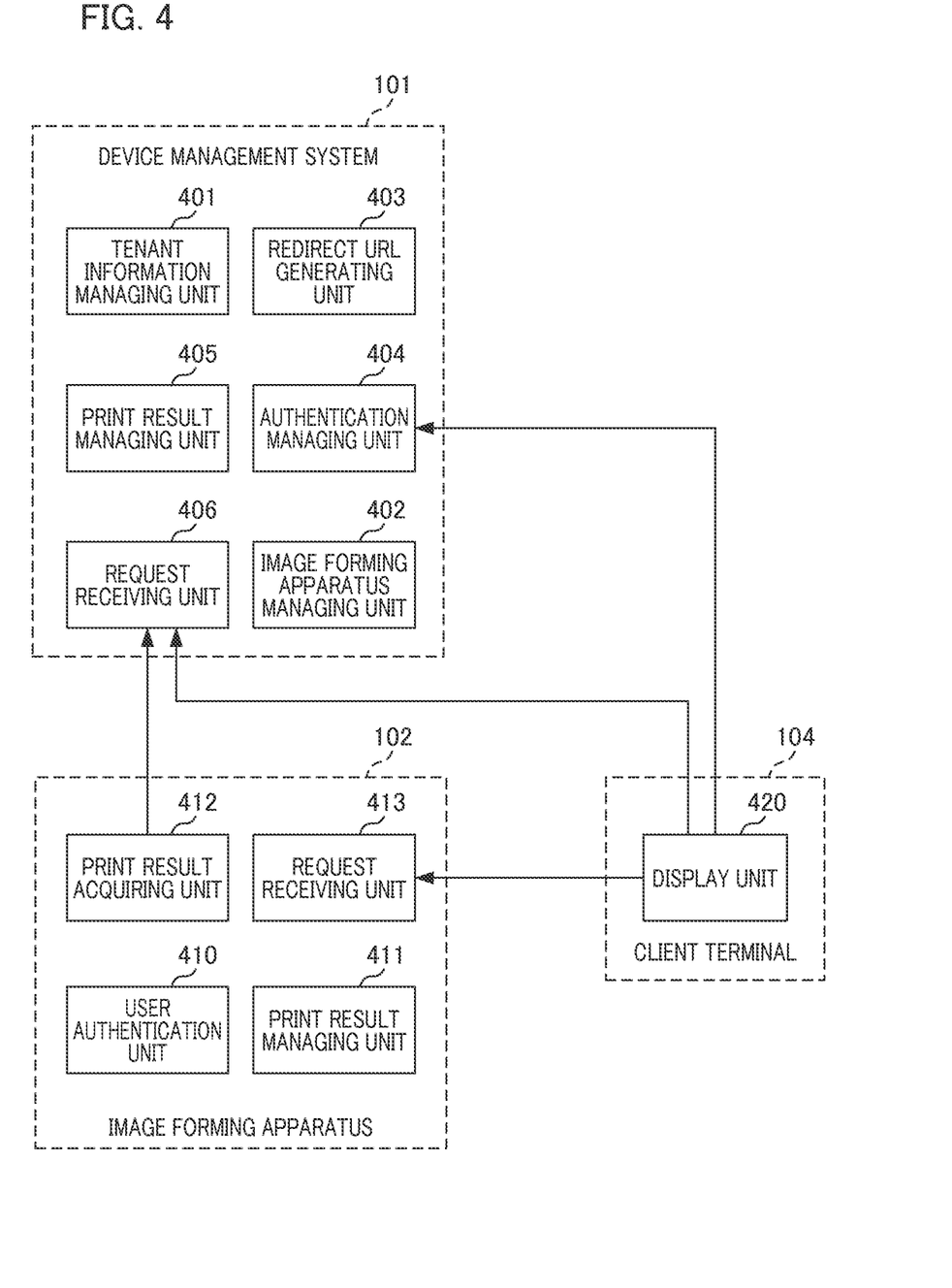
FIG. 4 is a functional block diagram of a device management system, an image forming apparatus and a client terminal.

FIG. 4 is functional block diagrams of the device management system, the image forming apparatus, and the client terminal. Programs for realizing functions of the respective devices shown in FIG. 4 are stored in the hard disk 206 or the hard disk 303 of the respective devices. The CPU 204 or the CPU 301 loads the programs into the memories 205 or the memory 302 and executes them to thereby realize these functions.

The device management system 101 includes a tenant information managing unit 401, an image forming apparatus managing unit 402, a redirect URL generating unit 403, an authentication managing unit 404, a print result managing unit 405, and a request receiving unit 406.

The tenant information managing unit 401 manages an aggregation such as a customer or a group which manage the image forming apparatus 102, that is, manages a tenant that is an environment to which the customer belongs. In the following, identification information of tenant identification, that is, customer information is called "a tenant ID". In this example, the device management system 101 manages management information of the image forming apparatus that is a network device installed in the tenant by associating it with the tenant information. Specifically, the image forming apparatus managing unit 402 manages the image forming apparatus 102 that belongs to the tenant. In the following, information of the image forming apparatus 102 managed by the image forming apparatus managing unit 402 is described as "device management information".

The device management information includes, for example, an IP address or a Mac address, configuration information for installed software and the like, an operation status such as a power OFF, sleep and the like, and an error occurrence status, and the like. The device management information is not limited to the above information. For example, the device management information may be consumable information, positional information, and the like. The device management system 101 manages print result information. The print result information is the total of print history information indicating how and when someone performed printing using which image forming apparatus, and how many pages. For example, the print result information indicates a usage status of at least one of color printing, duplex printing, and consolidated printing b a user.

The request receiving unit 406 receives an acquisition request for print result information from the image forming apparatus 102 or the client terminal 104. In the present embodiment, the device management system 101 manages a plurality of tenants. Thus, upon acquisition of the print result information, information representing which tenant print result information is desired for acquisition (tenant ID in the present embodiment) is required as a request parameter.

Upon receiving an acquisition request for print result information which is unauthenticated by the device management system 101, the redirect URL generating unit 403 determines a redirect destination of the request so as to generate a redirect URL. The authentication managing unit 404 is a unit for authenticating an access source that tries to access the device management system 101. In the present embodiment, device authentication for authenticating a device that is the access source and user authentication for authenticating a user that is the access source are performed.

The print result managing unit 405 manages print result information based on print history information for each tenant, that is, for each customer user. In this example, the print result managing unit 405 totals and manages print result information collected from one or more image forming apparatuses 102.

In the present embodiment, the print result managing unit 405 creates print result information for a user unit for each month. Users can confirm their own print history information via the print result managing unit 405. Information managed by the device management system 101 is not limited to the print result information. The device management system 101 may, manage, for example, failure information, error history information and contract information, and configuration information of the image forming apparatus.

The image forming apparatus 102 includes user an authentication unit 410, a print result managing unit 411, a print result acquiring unit 412, and a request receiving unit 413. The user authentication unit 410 executes authentication processing for a user when the user uses the image forming apparatus 102. The user whose authentication has been successfully made can use functions provided in the image forming apparatus 102 (a copy, a scan, and the like) according to given authority. For this, the use authentication unit 410 manages user information required for the authentication. A management method of the user information is not specifically limited. The user information may be managed by the image forming apparatus 102 or an authentication server (not shown) inside the network 100 on a customer side. Also, the authentication method is not specifically limited, and may include inputs of a user ID and a password via a keyboard, an IC card, or the like.

The print result acquiring unit 412 acquires, from the device management system, totaled print result information of a tenant to which the image forming apparatus 102 belongs among the print result information managed by the print result managing unit 405 provided in the device management system 101. The print result managing unit 411 saves the print result information acquired by the print result acquiring unit 412. Also, the print result managing unit 411 acquires print result information, among the saved print result information, of a user who has been authenticated by the user authentication unit 410.

The request receiving unit 413 receives the acquisition request for the print result information redirected by the device management system 101. Also, the request receiving unit 413 transmits print result information of a user who has been authenticated by the user authentication unit 410 to the client terminal 101 through the network. In the present embodiment, the print result acquiring unit 412 regularly acquires the print result information from the device management system 101 each day and the like, and updates the print result information in the print result managing unit 411. In the present embodiment, the image forming apparatus 102 manages the print result information for each user, but a management unit of such print result information is not limited thereto. For example, the image forming apparatus 102 may manage the print result information for each organization to which a user belongs.

The client terminal 104 includes a display unit 420. The display unit 420 connects to the device management system. 101 or the image forming apparatus 102 so as to input or display various types of information. In this example, the display unit 420 is realized by a Web browser. The client terminal 104 transmits the acquisition request for the print result information to the device management system 101.

When the acquisition request for the print result information has been made along with verified authentication information of either one of the device authentication or the user authentication to the device management system 101, the device management system 101 transmits the print result information of the pertinent tenant to the client terminal 104.

When the acquisition request for the print result information has been made to the device management system 101 without such authentication information, the device management system 101 redirects the acquisition request for the print result information to the image forming apparatus 102 having the print result managing unit 411 among the pertinent tenants. When the user authentication for the client terminal 104 has been performed by the user authentication unit 410 of the redirected image forming apparatus 102, the client terminal 101 acquires the print result information managed by the print result managing unit 411 from the image forming apparatus 102. In this manner, when any client terminal 104 whose device authentication cannot be performed by the device management system 101 acquires print result information, the image forming apparatus performs the user authentication without the user authentication by the device management system 101 so that the client terminal acquires print result information. That is, if user management is implemented inside the network 100 on the customer side, any client terminal 104 can acquire the print result information from the device management system 101 without newly or additional user management by the device management system 101.

Figure 5:
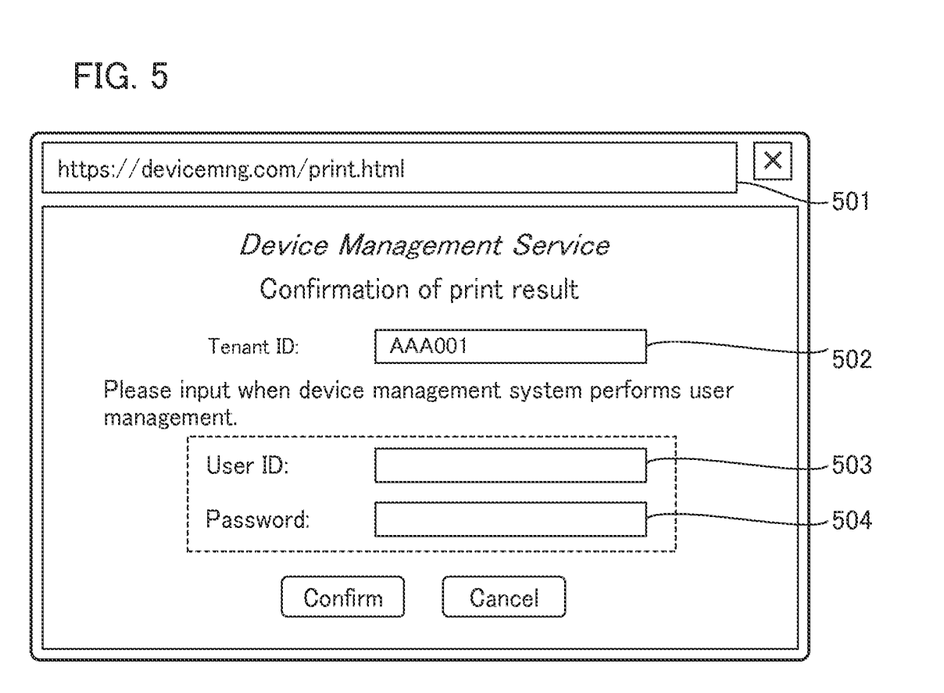
FIG. 5 is a diagram illustrating an acquisition screen example of print result information.
Figure 6:
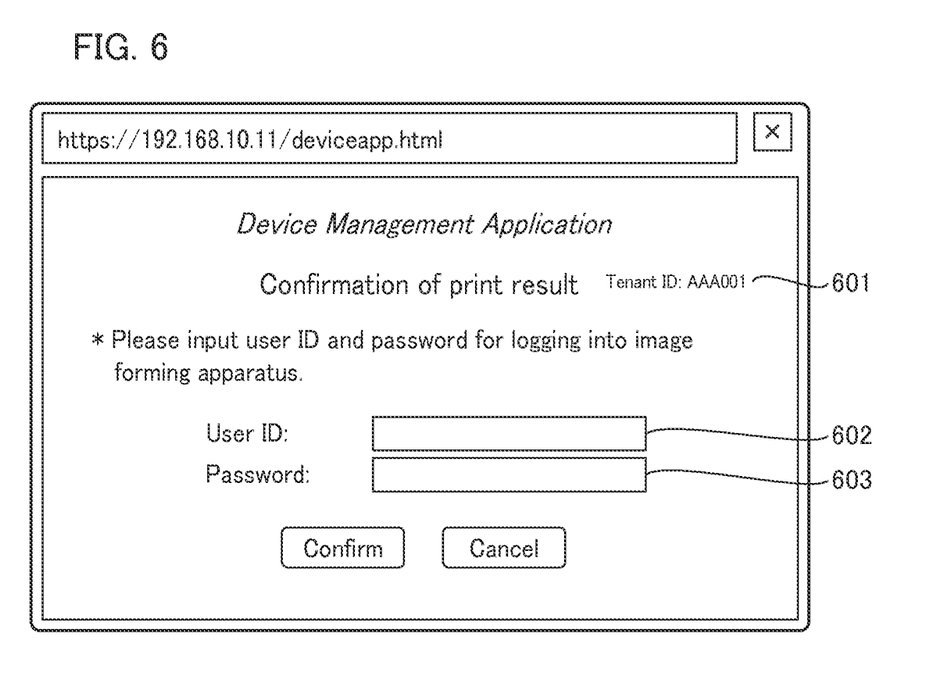
FIG. 6 is a diagram illustrating an acquisition screen example of print result information.

FIG. 5 and FIG. 6 are diagrams illustrating acquisition screen examples of print result information. FIG. 5 illustrates an acquisition screen displayed by the display unit 420 provided in the client terminal 104 when the client terminal 104 transmits the acquisition request for the print result information to the device management system 101.

A connection destination designating unit 501 is an area for designating a URL for acquiring the print result information managed by the device management system 101. In the present embodiment, although the Web browser transmits the acquisition request for the print result information depending on an input content on the acquisition screen for the print result information, a dedicated application for transmitting the acquisition request for the print result information may be employed. When such a dedicated application is employed, the connection destination designating unit 501 may be omitted in the case where a predetermined connection destination URL is set.

A tenant ID designating unit 502 is an area for designating an identifier of a tenant of which print result information is to be acquired. A user designates the tenant ID of the tenant to which the user belongs in the tenant ID designating unit 502. When the tenant ID has been designated as a URL parameter in the connection destination designating unit 501, a user is not required to explicitly designate the tenant ID in the tenant ID designating unit 502. A user ID designating unit 503 and a password designating unit 504 are required for designation only when the device management system 101 implements user management.

When a user ID designating unit 503 and the password designating unit 504 are designated, the authentication managing unit 404 provided in the device management system 101 transmits the print result information of the designated tenant to the client terminal 104 after performing the user authentication. When no user ID is designated in the acquisition request for the print result information, the device management system 101 redirects the acquisition request for the print result information to a URL of the image forming apparatus 102 having the print result managing unit 411 among the designated tenant.

FIG. 6 is an acquisition screen example of the print result information of the image forming apparatus 102 displayed by the display unit 420 provided in the client terminal 104 when the device management system 101 redirects the acquisition request for the print result information.

The tenant ID displaying unit 601 is an area for displaying the designated tenant ID in the tenant ID designating unit 502. A user ID designating unit 602 and a password designating unit 603 are areas for inputting a user ID and a password designated in the user authentication unit 410 provided in the image forming apparatus 102. When a user presses a confirmation button, the use authentication unit 410 of the image forming apparatus 102 transmits the print result information of the designated tenant to the client terminal 104 after performing the user authentication.

When the client terminal 104 transmits the acquisition request for the print result information to the device management system 101, authentication information for authentication by the image forming apparatus may not be transmitted as a parameter. In this case, the image forming apparatus that has received the redirected request performs the authentication without displaying the confirmation screen shown in FIG. 6, and transmits the print result information of the designated tenant to the client terminal 104.

Figure 7:
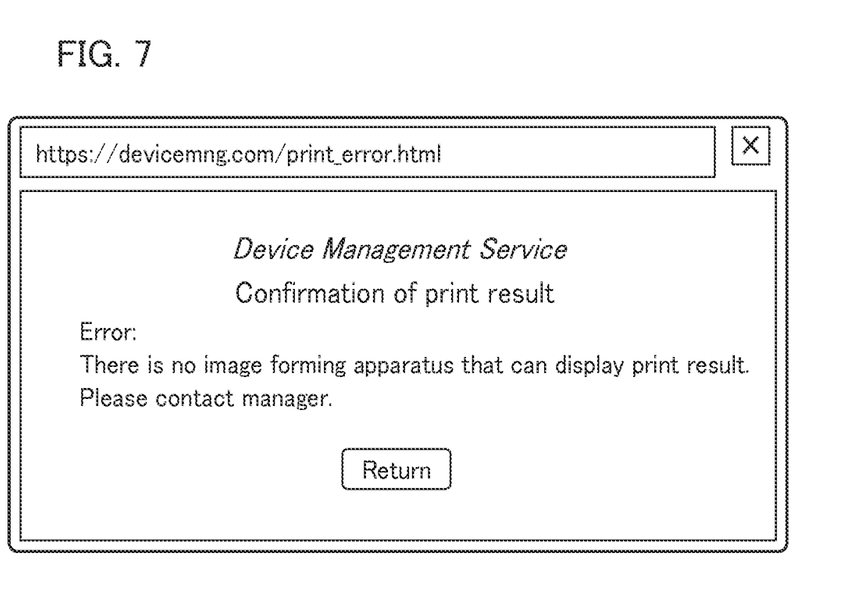
FIG. 7 is a diagram illustrating an error screen example.

FIG. 7 is a diagram illustrating an error screen example. The device management system 101 causes the display unit 420 provided in the client terminal 104 no display the error screen when no image forming apparatus serving as a redirect destination of the acquisition request for print result information has been retrieved.

Figure 8:
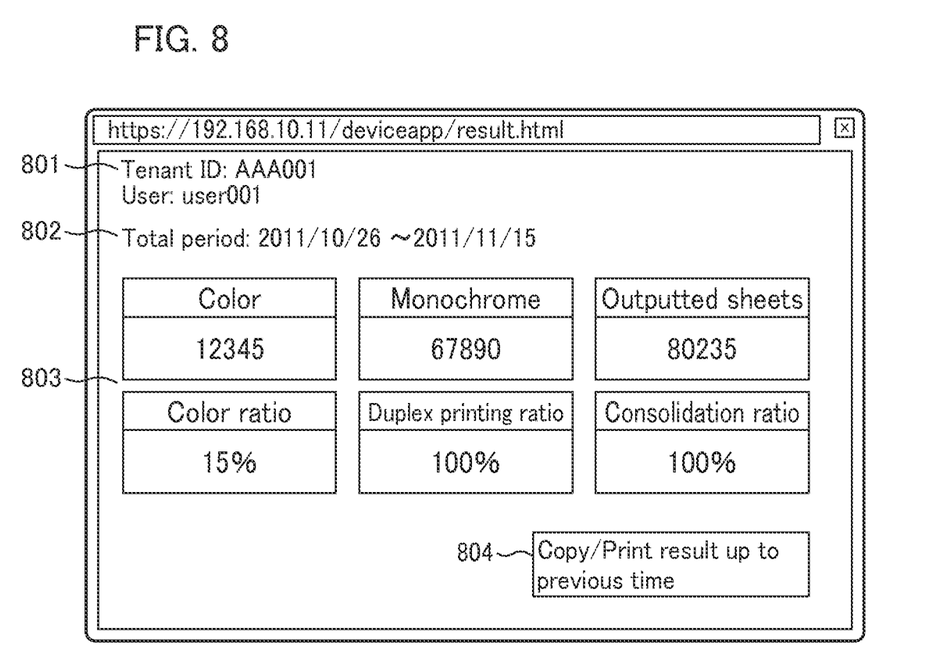
FIG. 8 is a diagram illustrating an example of an acquisition result screen of print result information.

FIG. 8 is a diagram illustrating an acquisition result screen example of the print result information. The display unit 420 provided in the client terminal 104 displays the acquisition result screen of the print result information when the device management system 101 or the image forming apparatus 102 transmits the print result information to the client terminal 104.

An authentication information displaying portion 801 is an area for displaying information of the client that has been authenticated by the device management system 101 or the image forming apparatus 102. A total period displaying unit 802 is an area for displaying a total period of the print result information. The screen shown in FIG. 8 displays the print result information that a user for whom a user ID is user001 has printed documents during 2011 Oct. 26 to 2011 Nov. 15 among tenants of which a tenant ID is AAA001.

A print result information displaying portion 803 is an area for displaying a print result relating to the designated user within a predetermined period. In the present embodiment, the display unit 420 displays the number of pages in color or monochrome printing, the outputted sheets number, a color ratio, a duplex printing ratio, and a consolidation ratio, but a display content is not limited thereto. A past copy/print result displaying button 804 is a button for designating the display of print result information in a period previous to the period displayed on the total period displaying portion 802.

Figure 9:
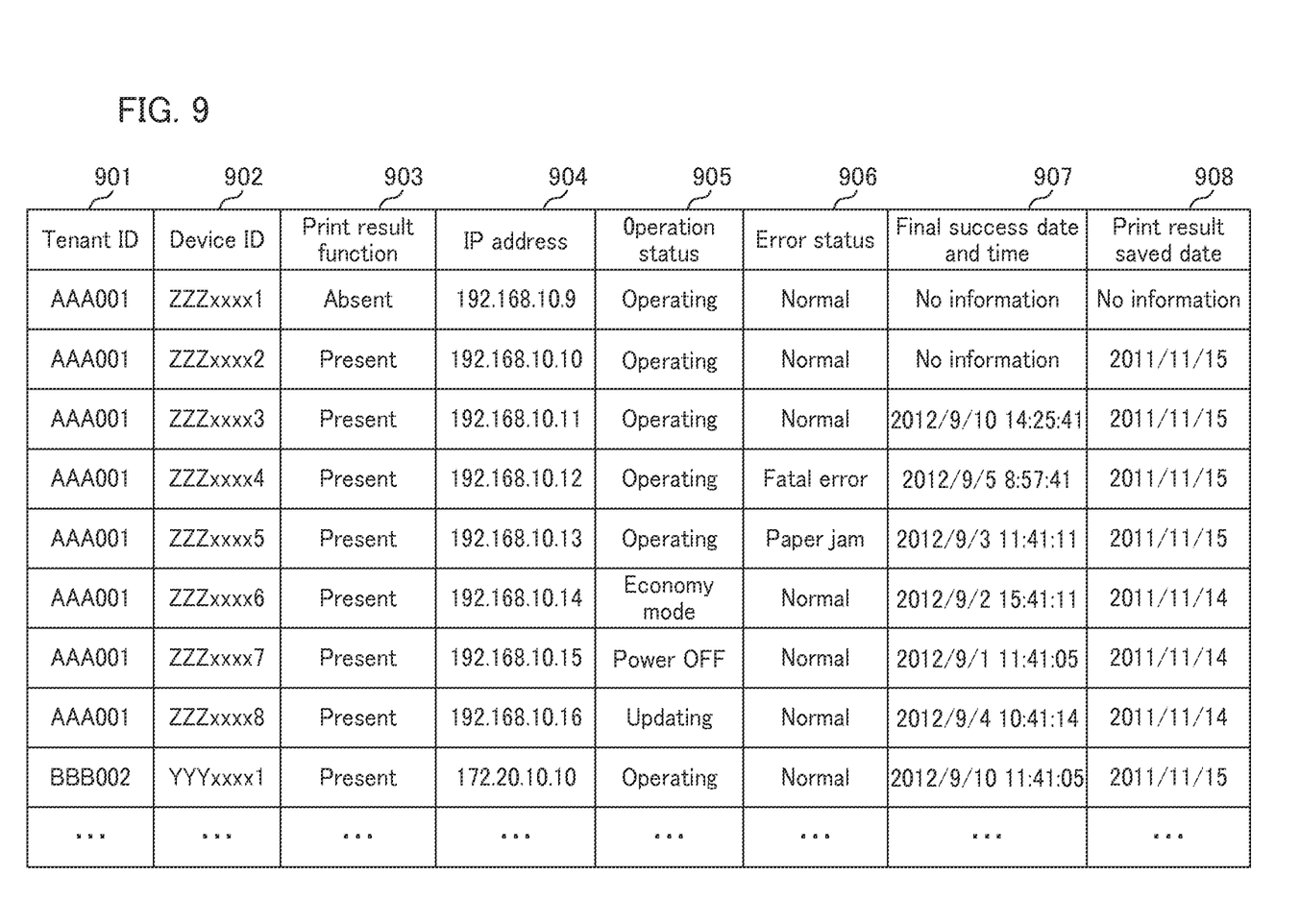
FIG. 9 is a diagram illustrating an example of device management information.

FIG. 9 is a diagram illustrating an example of device management information managed by the image forming apparatus managing unit 402 provided in the device management system. The device management information includes a tenant ID 901, a device ID 902, a print result function 903, an IP address 904, an operation status 905, an error status 906, she final success date and time 907, a print result saved date 908, and the like.

The tenant ID 901 is identification information for uniquely identifying a tenant to which each image forming apparatus belongs. With the tenant ID, each image forming apparatus that belongs to a tenant corresponding to the tenant ID is identified. The device ID 902 is identification information for uniquely identifying each image forming apparatus. The device ID 902 includes, for example, a Mac address or a serial number, or unique identification information with which the device management system 101 has sequentially numbered each image forming apparatus.

The print result function 903 indicates whether or not the print result acquiring unit 412 and the print result managing unit 411 are provided in the image forming apparatus 102. The image forming apparatus in which "present" is set in the print result function 903 is the image forming apparatus in which the print result function is provided. The image forming apparatus in which "absent" is set in the print result function 903 is the image forming apparatus in which the print result function is not provided. When deciding an image forming apparatus of the redirect destination, the device management system 101 searches for an image forming apparatus in which "present" is set with reference to the device management information.

The IP address 904 is address information (IP address) of the image forming apparatus 102. In the present embodiment, the device management system 101 links a pass "deviceapp.html" with the IP address 904 so as to create a URL of the redirect destination. If she image forming apparatus 102 holds a local address that is valid only in the network on a customer side and a global address that is valid even outside the network on the customer side, the device management system 101 may manage the local address and the global address in separate way. When the device management system 101 creates the URL of the redirect destination (redirect URL), the device management system 101 creates she redirect URL using the local address.

By creating a redirect URL using the local address since the device management system 101 creates the redirect URL using the local address, the redirect URL that is accessible by only the client terminal 104 in the network on the customer side can be created. In this manner, even if the designation of the tenant ID has been mistakenly made, a redirect to an image forming apparatus belonging to another tenant can be prevented.

The operation status 905 indicates an operation status of the image forming apparatus 102. In this example, and any one of "operating", "economy mode", "power OFF", or "updating" is set in the operation status 905, the device management system 101 comprehends the operation status of the image forming apparatus 102 by referring a content set in the operation status 905. A method in which the device management system 101 comprehends the operation status of the image forming apparatus is not limited to the method in which the set content is referred to and comprehended. For example, upon shifting the status of the image forming apparatus, the image forming apparatus itself may notify the device management system 101 of own status, or a device other than the image forming apparatus detects the shifted status in the image forming apparatus.

In the present embodiment, the device management system. 101 selects the image forming apparatus for which the operation status indicates "operating" as the image forming apparatus of the redirect destination. In this manner, a situation can be avoided where the image forming apparatus of she redirect destination does not operate and thus cannot respond to the acquistion request for the print result information.

The error status 906 indicates an error status that has occurred in the image forming apparatus. The device management system 101 comprehends the error status that occurs in the image forming apparatus by referring to a content set in the error status 906. In an example shown in FIG. 9, "paper jam" or "fatal error" are set to other than "normal", but a type of error is not limited thereto. Also, a method of comprehending the error status is not limited to the method of referring and comprehending the content set in the error status 906.

The device management system 101 selects the image forming apparatus of the redirect destination based on the error status that occurs in the image forming apparatus. The device management system 101 selects the image forming apparatus for which "normal" is set in the error status 906 as the image forming apparatus of the redirect destination.

Also, the device management system 101 selects the image forming apparatus that cannot execute printing but the print result acquiring unit 412 and the print result managing unit 411 normally operate as the image forming apparatus of the redirect destination. For example, the device management system 101 selects the image forming apparatus in which "a paper jam" is set in the error status 906 as the image forming apparatus of the redirect destination. Similar to the image forming apparatus in which "fatal error" is set in the error status 906, the device management system 101 does not select the image forming apparatus in which neither the print result acquiring unit 412 nor the print result managing unit 411 normally operates as the image forming apparatus of the redirect destination. In this manner, a situation can be avoided where the image forming apparatus cannot respond to the acquisition request for print result information.

The final success date and time 907 indicates a final date and time when the image forming apparatus 102 normally processed the acquisition request for print result information in the past. The device management system 101 selects the image forming apparatus by referring to a content set in the final success date and time 907. The device management system 101 selects the image forming apparatus of which a newer date and time is set in the final success date and time 907 as the image forming apparatus of the redirect destination. In this manner, since the device management system 101 stably processes the acquisition request for the print result information, a situation can be avoided where the image forming apparatus cannot respond to the acquisition request for the print result information.

The print result saved date 908 indicates a date and time when the image forming apparatus acquired the print result information from the device management system 101 by using the print result acquiring unit 412, and saved the acquired print result information in the print result managing unit 411. In the present embodiment, although the image forming apparatus acquires the print result information once a day from the device management system. 101, there is the possibility that the image forming apparatus cannot acquire the latest print result information at an acquisition time due to the power of the image forming apparatus being turned off or the like. Hence, the device management system 101 selects the image forming apparatus which has the newer print result saved date as the image forming apparatus of the redirect destination. In this manner, a situation can be avoided where the print result information held by the image forming apparatus selected as the redirect destination is old. Note that data configuration of the device management information is not limited to that shown in FIG. 9.

Figure 10:
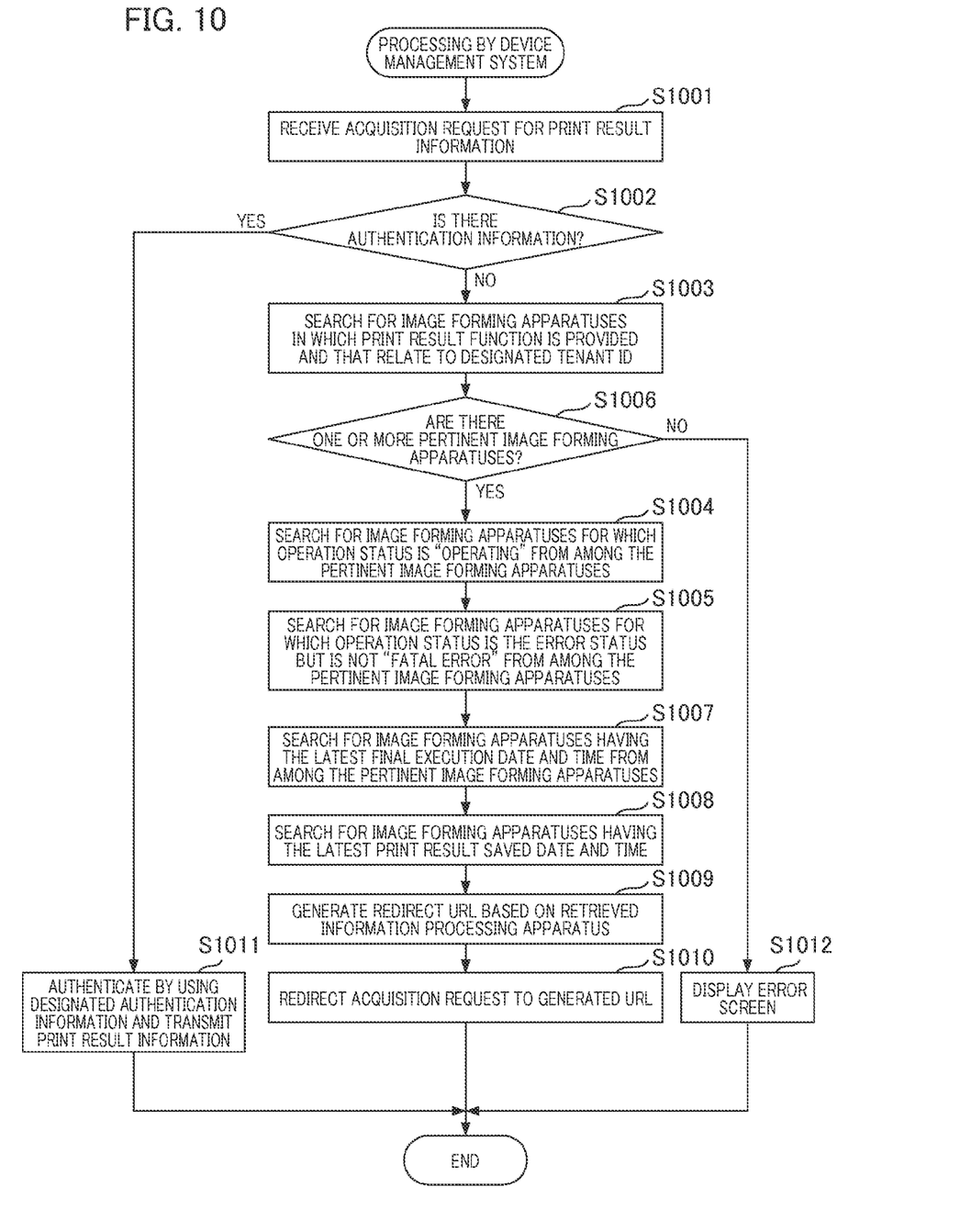
FIG. 10 is a flowchart explaining an operation processing example of a device management system.

FIG. 10 is a flowchart explaining an example of operation processing by the device management system. The operation processing explained with reference to FIG. 10 is realized by the CPU (FIG. 3) provided in the device management system 101 by reading the programs from the hard disk 303 into the memory 302 and executing the programs.

Firstly, the request receiving unit 406 provided in the device management system 101 receives a tenant ID as well as an acquisition request for print result information from the client terminal 104 (S1001). Subsequently, the request receiving unit 406 determines whether or not authentication information is accompanied by a request parameter (S1002).

When the authentication information is accompanied by the request parameter, the processing advances to S1011. Then, the authentication managing unit 404 performs authentication with the authentication information designated. When the authentication has succeeded, the print result managing unit 405 transmits the print result information of a tenant designated with the tenant ID to the client terminal 104 that is a request source. In this manner, when the device management system 101 implements user management, a user can securely acquire the print result information with the arbitrary client terminal 104 through the user authentication.

When no authentication information is accompanied by a request parameter, the processing advances to S1003. The the image forming apparatus managing unit 402 searches for the image forming apparatuses in which the print result function is provided from among the image forming apparatuses corresponding to the designated tenant ID by referring to the device management information (S1003).

Next, the image forming apparatus managing unit 402 determines in S1006 whether or not the image forming apparatuses in which the print result function is provided have been retrieved in the search processing in S1003. When there is no image forming apparatus retrieved, the processing advances to S1012. Then, the request receiving unit 406 transmits the error screen shown in FIG. 7 to the client terminal 104.

When there is one or more the retrieved image forming apparatus, the processing advances to S1004. Then, the image forming apparatus managing unit 402 searches for the image forming apparatuses for which the operation status 905 is "operating" from among the image forming apparatuses providing the print result function (S1004).

Next, the image forming apparatus managing unit 402 searches for the image forming apparatuses that can respond to the print result acquiring request (S1005). In the present embodiment, the image forming apparatus managing unit 402 searches for the image forming apparatus for which the error status 906 is not "fatal error".

Next, the image forming apparatus managing unit 402 searches for the image forming apparatuses having the latest final execution date and time (S1007). Subsequently, the image forming apparatus managing unit 402 searches for the image forming apparatuses having the latest the print result saved date 908 (S1008).

Finally, the image forming apparatus managing unit 402 decides one image forming apparatus as the redirect destination from among the image forming apparatuses retrieved in the search processing from S1004 to S1008. Then, the redirect URL generating unit 403 generates a redirect URL that is control information for causing the client terminal 104 to access the redirect destination (S1009). Then, the request receiving unit 406 transmits the redirect URL to the client terminal 104 (S1010).

The above search processing from S1004 to S1008 may be arbitrarily combined for accommodation. Also, the search processing from S1004 to S1008 does not need to be fully performed, but the image forming apparatus managing unit 402 may perform at least one or more processes in the search processing.

As an example, the device management system 102 performs the search processing in S1005 using the image forming apparatuses retrieved in S1004 as targets, and performs the search processing in S1007 or S1008 using the image forming apparatuses retrieved in S1005 as targets. Then, the device management system 102 generates the redirect URL corresponding to the imago forming apparatus retrieved in S1007 or S1008.

Also, the image forming apparatus managing unit 402 presets a priority as to which image forming apparatus is preferentially set as the redirect destination among the image forming apparatuses retrieved in the each search processing, and decides the redirect destination depending on the priority.

Figure 11:
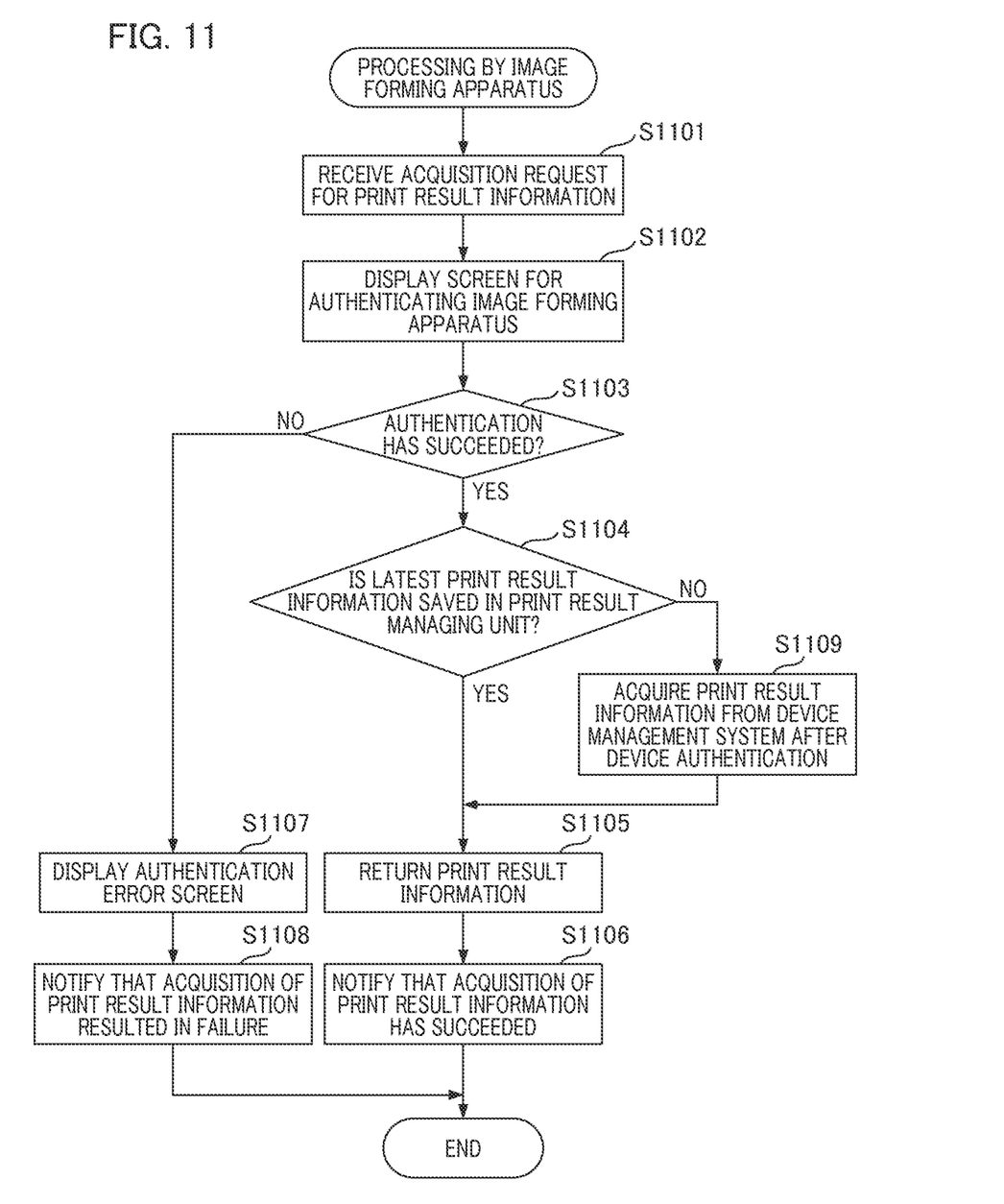
FIG. 11 is a flowchart explaining an operation processing example of an image forming apparatus.

FIG. 11 is a flowchart explaining an operation processing example of the image forming apparatus. An explanation with reference to FIG. 11 will be given of operation processing when the client terminal 104 receives the acquisition request for the print result information redirected from the device management system 101. The operation processing shown in FIG. 11 is realized by the CPU 204 provided in she image forming apparatus 102 by reading the programs stored in the hard disk 206 into the memory 205 and executing the programs.

Firstly, the request receiving unit 413 provided in the image forming apparatus 102 receives the acquisition request for the print result information redirected from the device management system 101 (S1101).

Next, the request receiving unit 413 transmits the screen for the user authentication (the acquisition screen of print result information shown in FIG. 6) to the client terminal 104 (S1102). Subsequently, the user authentication unit 410 performs the user authentication by using the authentication information designated by the client terminal 104, that is, a user ID and a password input on the acquisition screen of the print result information.

The user authentication unit 410 determines whether or not the user authentication has succeeded (S1103). When the user authentication has succeeded, the print result managing unit 411 determines whether or not the latest print result information is saved (S1104). When the latest print result information is saved, the processing advances to S1105. When the latest print result information is not saved, the print result acquiring unit 412 acquires print result information from the device management system 101 (S1109). Then the processing advances to S1105.

Next, the print result managing unit 411 transmits the acquired print result information to the client terminal 104 via the request receiving unit 413. Finally, the print result managing unit 411 notifies the device management system 101 that the redirected acquisition request for the print result information has been normally processed (S1106).

On the other hand, when the user authentication has failed in S1103, the request receiving unit 413 transmits the error screen to the client terminal 104 (S1107). Then, the print result managing unit 411 notifies the device management system 101 that the redirected acquisition request for the print result information has resulted in failure (S1108).

As discussed above, in response to the request from a client, the management system according to the present invention can provide result information for the customer's user to the client without increasing the load relating to user management and while ensuring security.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as no encompass all such modifications and equivalent structures and functions.

This application claims the benefit of Japanese Patent Application No. 2013-005262 filed Jan. 16, 2013, which is hereby incorporated by reference herein in its entirety.

What is claimed is:

1. A management system that manages customer information of a customer and information of one or more network devices installed in an environment to which the customer belongs, comprising:
    a totaling unit configured to total result information of each customer collected from the one or more network devices;
    a receiving unit configured to receive a request including customer information from a client;
    a decision unit configured to decide at least one of the one or more network devices installed in an environment corresponding to the customer information included in the request for user authentication; and
    a responding unit configured to respond to the client with control information for causing the client to access the decided one or more network devices,
    wherein, when the user authentication has succeeded at any one of the network devices accessed by the client with the control information, the result information of the customer totaled by the totaling unit is provided to the client via the network device that has performed the user authentication.

2. The management system according to claim 1, wherein the decision unit is configured to decide the network device that includes a function for providing the result information to the client among the one or more network devices installed in the environment corresponding to the customer information.

3. The management system according to claim 2, wherein the decision unit is configured to decide the network device currently being operated among the one or more network devices installed in the environment corresponding to the customer information.

4. The management system according to claim 3, wherein the decision unit is configured to decide the network device that falls into at least any one of the network devices in which no error occurs such that the result information is not provided to the client, the network device having the newest final date and time at which the result information has successfully been provided to the client, or the network device having the newest date and time at which the result information has been acquired from the management system among the network devices currently being operated.

5. The management system according to claim 1, further comprising a transmitting unit configured to transmit the latest result information of the user already totaled when the network device accessed by the client with the control information has succeeded the user authentication but does not hold the latest totaled result information of the user.

6. The management system according to claim 1, wherein the result information indicates at least any one of a usage status of color printing, duplex printing, or consolidated printing by the user.

7. The management system according to claim 1, wherein the information of the network device being managed includes address information available only in a network corresponding to the customer information and address information also available outside the network, and wherein the responding unit generates the control information to respond to the client based on the address information available only in the network corresponding to the customer information included in the request.

8. A management method of a management system that manages customer information of a customer and information of one or more network devices installed in an environment to which the customer belongs, comprising:

totaling result information for each customer collected from the one or more network devices;

receiving a request including the customer information from a client;

deciding at least one of the one or more network devices installed in an environment corresponding to the customer information included in the request for user authentication; and responding to the client with control information for causing the client to access the decided one or more network devices, wherein, when the user authentication has succeeded at any one of the devices accessed by the client with the control information, the totaled result information of the customer is provided to the client via the network device that has performed the user authentication.

9. A non-transitory storage medium on which is stored a computer program for making a computer execute a management method of an management system that manages customer information of a customer and information of one or more network devices installed in an environment to which the customer belongs, comprising:

totaling result information for each customer collected from the one or more network devices;

receiving a request including the customer information from a client;

deciding at least one of the one or more network devices installed in an environment corresponding to the customer information included in the request for user authentication; and responding to the client with control information for causing the client to access the decided one or more network devices, wherein, when the user authentication has succeeded at any one of the devices accessed by the client with the control information, the totaled result information of the customer is provided to the client via the network device that has performed the user authentication.

* * * * *